(12) United States Patent
DeLuca et al.

(10) Patent No.: US 9,589,062 B2
(45) Date of Patent: Mar. 7, 2017

(54) DURABLE MEMENTO SYSTEM

(71) Applicant: DURAGIFT LLC, Windham, NH (US)

(72) Inventors: Mark DeLuca, Windham, NH (US); Spencer Webb, Windham, NH (US)

(73) Assignee: DURAGIFT, LLC, Windham, NH (US)

( * ) Notice: Subject to any disclaimer, the term of this patent is extended or adjusted under 35 U.S.C. 154(b) by 77 days.

(21) Appl. No.: 13/831,471

(22) Filed: Mar. 14, 2013

(65) Prior Publication Data

US 2013/0204865 A1 Aug. 8, 2013

(51) Int. Cl.
*G06F 17/30* (2006.01)
*G06Q 30/02* (2012.01)

(52) U.S. Cl.
CPC .. *G06F 17/30876* (2013.01); *G06F 17/30598* (2013.01); *G06F 17/30879* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,386,457 B1 | 5/2002 | Sorie | |
| 6,594,644 B1 | 7/2003 | Van Dusen | |
| 6,666,378 B2 | 12/2003 | Davila et al. | |
| 7,055,740 B1 | 6/2006 | Schultz et al. | |
| 7,130,817 B2 | 10/2006 | Karas et al. | |
| 7,264,155 B2 | 9/2007 | Halbur et al. | |
| 7,934,661 B2 | 5/2011 | Nichols | |
| 7,959,065 B2 | 6/2011 | Rosenblatt et al. | |
| 8,086,494 B2 | 12/2011 | Dooley et al. | |
| 8,190,519 B1 | 5/2012 | Angilivelil et al. | |

(Continued)

FOREIGN PATENT DOCUMENTS

| | | | | |
|---|---|---|---|---|
| EP | 1215610 A3 | | 1/2003 | |
| KR | WO2012111926 | * | 2/2012 | ............. G06Q 50/32 |
| WO | 2009005487 | | 1/2009 | |

OTHER PUBLICATIONS

Thankster—http://www.marketwired.com/press-release/thankster-qr-codes-turn-static-thank-you-cards-other-greetings-into-dynamic-1599872.htm.*

(Continued)

*Primary Examiner* — Kevin L Young
(74) *Attorney, Agent, or Firm* — ARC IP Law, PC; Joseph J. Mayo

(57) ABSTRACT

Durable memento system that enables the storage of data associated with mementos, which are objects that serve to provide a reminder of a person, place, thing, or an event. Embodiments are configured to store and recall data including but not limited to pictures, movies, sounds, text, or other information such as performance data indirectly associated with a memento such as but not limited to a keepsake, souvenir, gift, gift card, medal or award, tool or any combination thereof. One or more embodiments may include a visual and/or machine-readable and/or human-readable code to associate the data with the memento. The durable data may be stored remote from the memento, which prevents obsolescence by securing data robustly. This enables the data to be accessed years later even if the file formats or display technology for the data has changed by that time and even if the original memento has been lost.

28 Claims, 3 Drawing Sheets

(56) References Cited

U.S. PATENT DOCUMENTS

| | | | |
|---|---|---|---|
| 8,272,562 B2 | 9/2012 | Ziegler | |
| 8,280,825 B2 | 10/2012 | Friedman | |
| 8,292,166 B2 | 10/2012 | Gomez et al. | |
| 8,651,370 B1* | 2/2014 | Mudrick et al. | 235/375 |
| 2001/0053980 A1* | 12/2001 | Suliman, Jr. | G06Q 30/012 |
| | | | 705/26.1 |
| 2002/0156737 A1* | 10/2002 | Kahn | G06F 21/10 |
| | | | 705/51 |
| 2003/0004997 A1 | 1/2003 | Parker et al. | |
| 2003/0130907 A1 | 7/2003 | Karas et al. | |
| 2005/0038712 A1* | 2/2005 | Veeneman | G06Q 20/045 |
| | | | 705/26.8 |
| 2005/0091120 A1 | 4/2005 | Auletta | |
| 2006/0157554 A1 | 7/2006 | Halbur et al. | |
| 2007/0016864 A1* | 1/2007 | Kummerli | G06F 3/0481 |
| | | | 715/716 |
| 2007/0146758 A1* | 6/2007 | Lee | 358/1.13 |
| 2007/0261071 A1 | 11/2007 | Lunt et al. | |
| 2008/0267504 A1 | 10/2008 | Schloter et al. | |
| 2008/0281692 A1* | 11/2008 | Zhang | G06Q 20/10 |
| | | | 705/14.16 |
| 2009/0144104 A1* | 6/2009 | Johnson | G06Q 30/02 |
| | | | 705/303 |
| 2009/0258710 A1 | 10/2009 | Quatrochi et al. | |
| 2009/0292764 A1* | 11/2009 | Kamen | G06Q 10/00 |
| | | | 709/203 |
| 2010/0017278 A1 | 1/2010 | Wilen et al. | |
| 2010/0084469 A1* | 4/2010 | Kuyper-Hammond et al. | 235/462.01 |
| 2011/0040649 A1* | 2/2011 | Dooley et al. | 705/26.5 |
| 2011/0153462 A1 | 6/2011 | Granich | |
| 2011/0283172 A1* | 11/2011 | Berger | G06Q 50/01 |
| | | | 715/202 |
| 2012/0054589 A1 | 3/2012 | Berger et al. | |
| 2012/0067943 A1* | 3/2012 | Saunders et al. | 235/375 |
| 2012/0085828 A1* | 4/2012 | Ziegler | 235/493 |
| 2012/0209748 A1 | 8/2012 | Small | |
| 2012/0239513 A1* | 9/2012 | Oliver | G06Q 30/0643 |
| | | | 705/14.73 |
| 2012/0260190 A1 | 10/2012 | Asar et al. | |
| 2012/0265758 A1 | 10/2012 | Berger et al. | |
| 2012/0271667 A1* | 10/2012 | Serling | G06Q 30/0233 |
| | | | 705/5 |
| 2012/0271732 A1 | 10/2012 | Glass et al. | |
| 2012/0300087 A1* | 11/2012 | Shore et al. | 348/207.1 |
| 2013/0043302 A1* | 2/2013 | Powlen et al. | 235/375 |
| 2013/0073403 A1* | 3/2013 | Tuchman | H04W 8/265 |
| | | | 705/16 |
| 2013/0110808 A1* | 5/2013 | Naftolin | G06Q 10/10 |
| | | | 707/707 |
| 2013/0173713 A1* | 7/2013 | Anderson | G06Q 10/10 |
| | | | 709/205 |
| 2013/0346337 A1* | 12/2013 | O'Donnell | G06Q 10/0833 |
| | | | 705/333 |
| 2014/0014714 A1* | 1/2014 | Tang | B65D 25/205 |
| | | | 235/375 |
| 2014/0058955 A1* | 2/2014 | Calman | G06Q 30/012 |
| | | | 705/302 |
| 2014/0117076 A1* | 5/2014 | Eberlein | 235/375 |
| 2014/0181941 A1* | 6/2014 | Quint | 726/7 |

OTHER PUBLICATIONS

How to make personalized QR code gift tags—http://www.cnet.com/how-to/how-to-make-personalized-qr-code-gift-tags/.*
Buchholz "Keepsakes that Talk," KreativeScraps and Photography, Dec. 6, 2012, 6 pages.
Qr Code Gifts, Zazzle, Mar. 25, 2013, 5 pages.

* cited by examiner

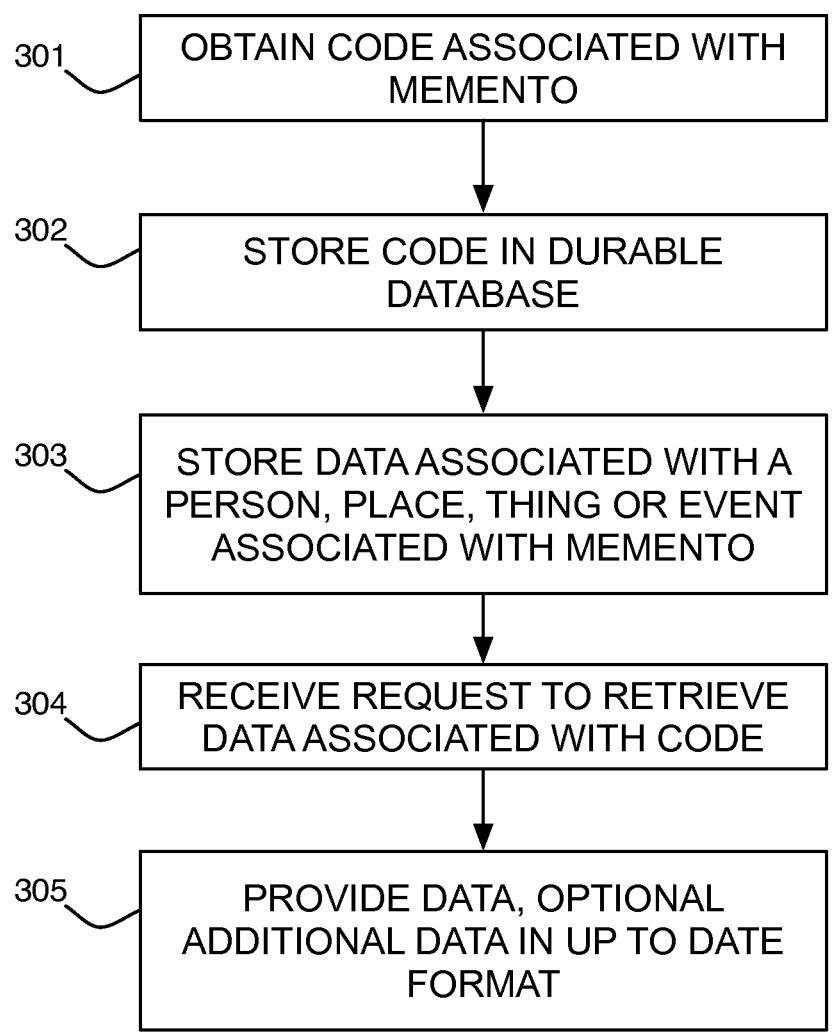

DURABLE MEMENTO SYSTEM

BACKGROUND OF THE INVENTION

Field of the Invention

One or more embodiments of the invention are related to the field of data processing systems and durable storage of data associated with mementos, which are objects that serve to provide a reminder of a person, place, thing, or an event. More particularly, but not by way of limitation, one or more embodiments of the invention enable a durable memento system configured to store and recall data including but not limited to pictures, movies, sounds, text, or other information such as performance data associated with a memento including but not limited to a keepsake, souvenir, gift, gift card, medal or award, tool or any combination thereof.

Description of the Related Art

Current solutions do not enable a user to associate multimedia with a gift in a durable manner. For example, users may take pictures at an event and even post the pictures on a website such as a social media or picture sharing website. However, there is no current way in which to find out what event or multimedia exists for a particular gift or other object.

In addition, if the images are not uploaded to a website, but stored on a local device or even in hardcopy format, they can be lost if the local device is lost or if the hardcopy format is lost, stolen or is destroyed by fire or flooding for example.

In short, there is no known manner in which to store or retrieve multimedia associated with a memento such as a keepsake or souvenir, which limits the ability to recall the person, place, thing or event associated with the memento.

There is no known solution to scan a code associated with a gift and remember who gave the gift or at what event the gift was given for example or for what purpose. Currently, a gift is a gift with only the utility provided by the gift itself without any consideration for any of the data surrounding the gift.

Gift cards are a $100 Billion industry and ever growing. Gift cards are given, used and generally thrown away without any way of storing any multimedia or other event related data for example for later retrieval. Currently, only data such as financial data, or the amount of the value of the card are linked to external data for example at a bank or other financial institution or card issuing entity. The data may be viewable through a website, or through virtual reality locally by scanning information on the card, but that data is directly associated with the card and not associated with the person who gave the card as a gift, place where the gift was given, thing or things associated with the card, such as the weather, maps, or other metadata associated with the gift including but not limited to hyperlinks, or event at which the gift card was given.

For at least the limitations described above there is a need for a durable memento system.

BRIEF SUMMARY OF THE INVENTION

One or more embodiments described in the specification are related to a durable memento system that enables the storage of data associated with mementos, which are objects that serve to provide a reminder of a person, place, thing, or an event. Embodiments are configured to store and recall data including but not limited to pictures, movies, sounds, text, or other information such as performance data associated with a memento including but not limited to a keepsake, souvenir, gift, gift card, medal or award, tool or any combination thereof. In one or more embodiments, the data is not directly associated with the memento itself per se, although the memento may include this data, which is known herein as "other data", e.g., gift card value or serial number or account number or financial information related to an account number, or information not related to the person, place, thing or event directly. The data however, may include pictures, movies, sounds, text, or other information such as performance data associated with a memento that is indirectly associated with the card. This may include data associated with the person who gave the memento, place where the memento was given, thing or things associated with the memento, such as the weather, maps, or other metadata associated with the memento including but not limited to hyperlinks, or event at which the memento was given. Durable association of this type of data with a memento is unknown in the art. One or more embodiments may include a visual and/or machine-readable and/or human-readable code to associate the data with the memento. The durable data may be stored remote from the memento, which prevents obsolescence by securing data robustly and in one or more formats that may be altered at a later time. This enables the data to be accessed years later even if the file formats or display technology for the data has changed by that time and even if the original memento has been lost.

Embodiments of the durable memento system include a memento that includes a physical object, generally having utility, in addition to providing a code associated with the memento. In addition, embodiments of the invention include data storage that is configured to store and retrieve the code and also configured to store and retrieve data associated with the memento. The data storage is coupled to a computer, for example a server and a communications network, for example the Internet to enable remote access from any location.

Embodiments of the system may include any type of memento, for example a keepsake, souvenir, gift, gift card, medal or award, tool or any combination thereof. Examples further include but are not limited to items such as a special event coin, challenge coin, employee award, marketing giveaway, tournament award, medal, trophy, golf divot tool and pet tags.

In one or more embodiments, the code is a visual code that is human-readable or machine-readable. Alternatively or in combination, the code may include a non-visual code that is audible or machine-readable. An example of a visual code that is human-readable is an alphanumeric code. One or more embodiments may utilize a code that is a machine-readable bar code that includes a series of parallel lines that travel in one direction, or a machine-readable two-dimensional bar code. Robust and long lasting embodiments may utilize a code that is engraved onto the memento. Other embodiments of the code include a machine-readable radio frequency identification code. Embodiments of the invention may tag a memento after the memento is constructed, for example with an attachable code, or permanent code or any other type of code that may be associated with the memento for example.

One or more embodiments of the data include pictures, movies, sounds, text or performance data associated with the memento. These types of data are not intended to be limiting and may include data in any known format. If the data is stored in one format that becomes obsolete, the system is configured to translate the format into a more current format. Thus, data in out of date file formats, such as older movie file formats, or even on out of date physical formats, such as floppy disks, that are virtually unreadable at this time, may still be accessed using one or more embodiments of the system. For example, at least one embodiment of the system is configured to convert the data from a stored format to a retrieved format via the computer and transmitted over the communications network on retrieval.

In one or more embodiments, the data may further include advertisements, hyperlinks to gifts or prizes or any combination thereof. This enables the memento to be augmented not only with event or other multimedia data associated with the memento, but also with additional information that may provide a source of revenue for businesses.

Embodiments of the system may obtain the code in a variety of ways. For example, the code may be obtained via the computer after the computer presents an interface having a code entry user interface element. In one or more embodiments, the code may be obtained by the computer from a mobile computer after the mobile computer presents an interface having a code entry user interface element. The code may also be obtained by the computer from a mobile computer after the mobile computer obtains the code visually from the memento through use of a camera coupled with the mobile computer and the computer obtains the code from the mobile computer. Alternatively, or in combination, the code may be obtained by the computer from a mobile computer after the mobile computer obtains the code electronically from the memento through use of a scanner coupled with the mobile computer.

When the data is retrieved at any time after being stored, regardless of the format that the data was stored in, the computer displays the data that includes pictures, movies, sounds, text, or performance data associated with the memento, or hyperlinks thereto, for example on a webpage.

BRIEF DESCRIPTION OF THE DRAWINGS

The above and other aspects, features and advantages of the invention will be more apparent from the following more particular description thereof, presented in conjunction with the following drawings wherein:

FIG. 3 illustrates an embodiment of the processing that is utilized by the system to implement the durable memento system.

DETAILED DESCRIPTION OF THE INVENTION

A durable memento system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
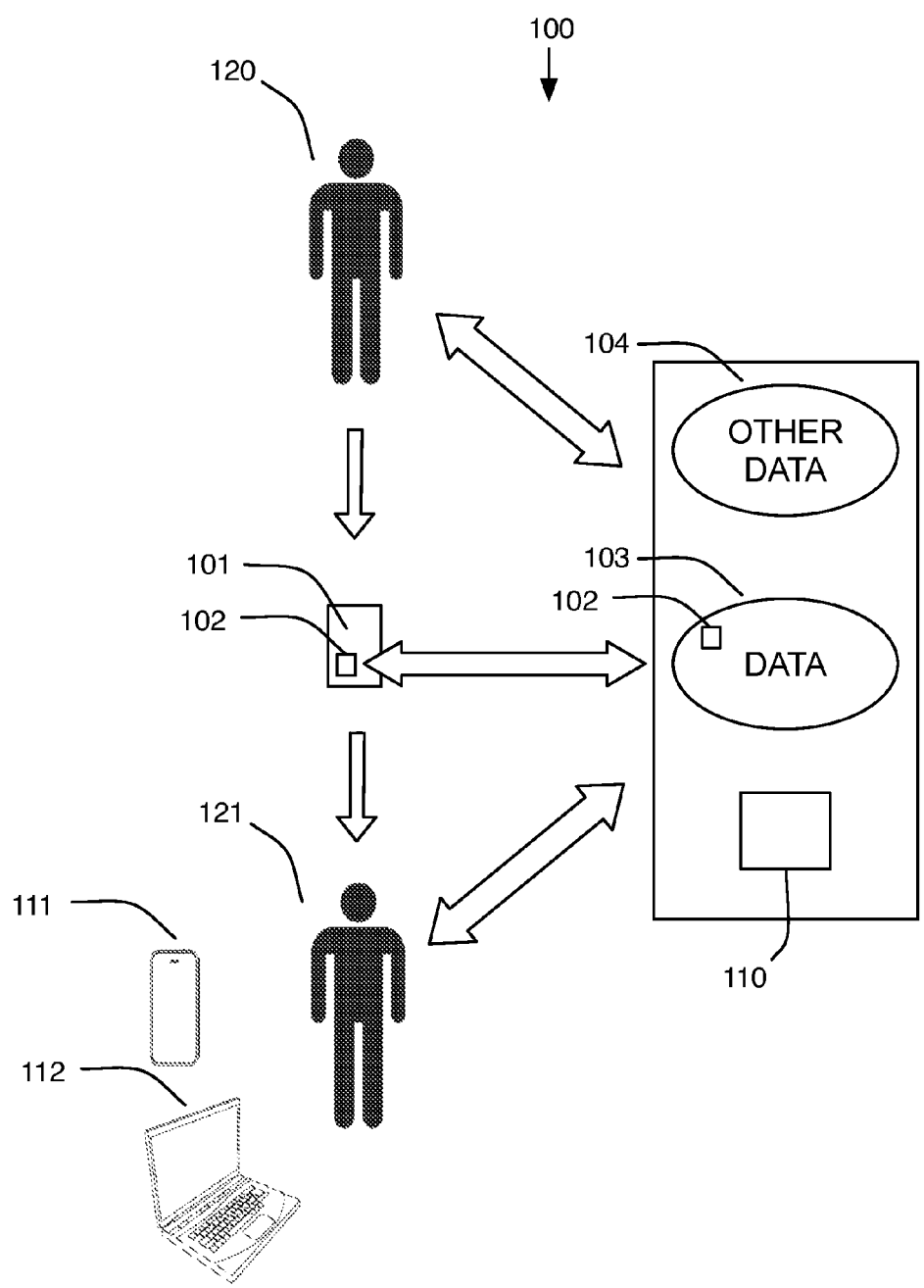
FIG. 1 illustrates an architectural view of at least one embodiment of the durable memento system.

FIG. 1 illustrates an architectural view of at least one embodiment of the durable memento system 100 that enables the storage of data 103 associated with a memento 101, which is an object that serves to provide a reminder of a person, place, thing, or an event. Embodiments of system 100 are configured to store and recall data 103 including but not limited to pictures, movies, sounds, text, or other information such as performance data or any other data that is indirectly associated with memento 101. The memento may include any object such as but not limited to, a keepsake, souvenir, gift, gift card, medal or award, tool or any combination thereof. Although the memento may be associated with "other data" that may include a value of the card, e.g., directly related to the value of the card or an account associated therewith, the data itself is indirectly related to the memento, e.g., directly associated with at least the person who gave the memento, place where the memento was given or received, or an event where the memento was received or any combination thereof. One or more embodiments of the memento 101 may include a visual and/or machine-readable and/or human-readable code 102 to associate the data with the memento. The durable data 103 may be stored remote from the memento, for example in a server having associated computer 110. Optionally, local storage on the memento may be utilized, alone or in combination with a remote server, however if the memento is lost and the only storage is on the memento, then the memento and all indirectly related multimedia may be lost, i.e., non-durable. Remote storage, alone or in combination with local memento storage prevents obsolescence by securing data robustly and in one or more formats that may be altered at a later time, for example as technology changes and file formats change or are replaced. This enables the data to be accessed years later even if the file formats or display technology for the data has changed by that time and even if the original memento has been lost. "Other data" 104 may be associated with the memento and include financial information, or links or gifts or other items or services that are not directly associated with the memento or person, place, thing or event, but which may provide revenue, financial information or values, or information streams for example targeted at the user who gave the memento 120 or the user who received the memento 121. In one or more embodiments user 120 is the same person as user 121 and simply wishes to retain information related to the memento for later retrieval and display for example. In one or more embodiments, the code may be stored in any format on or associated with the memento and in or associated with the data on the computer or in a database associated with computer 110 for example. User 120 or 121 or both may utilize mobile device 111 and/or computer 112 to store code 102 on the memento, for example via a printable label or obtain code 102 from memento 101 for example via a scanner or camera as will be discussed in detail below.

Figure 2:
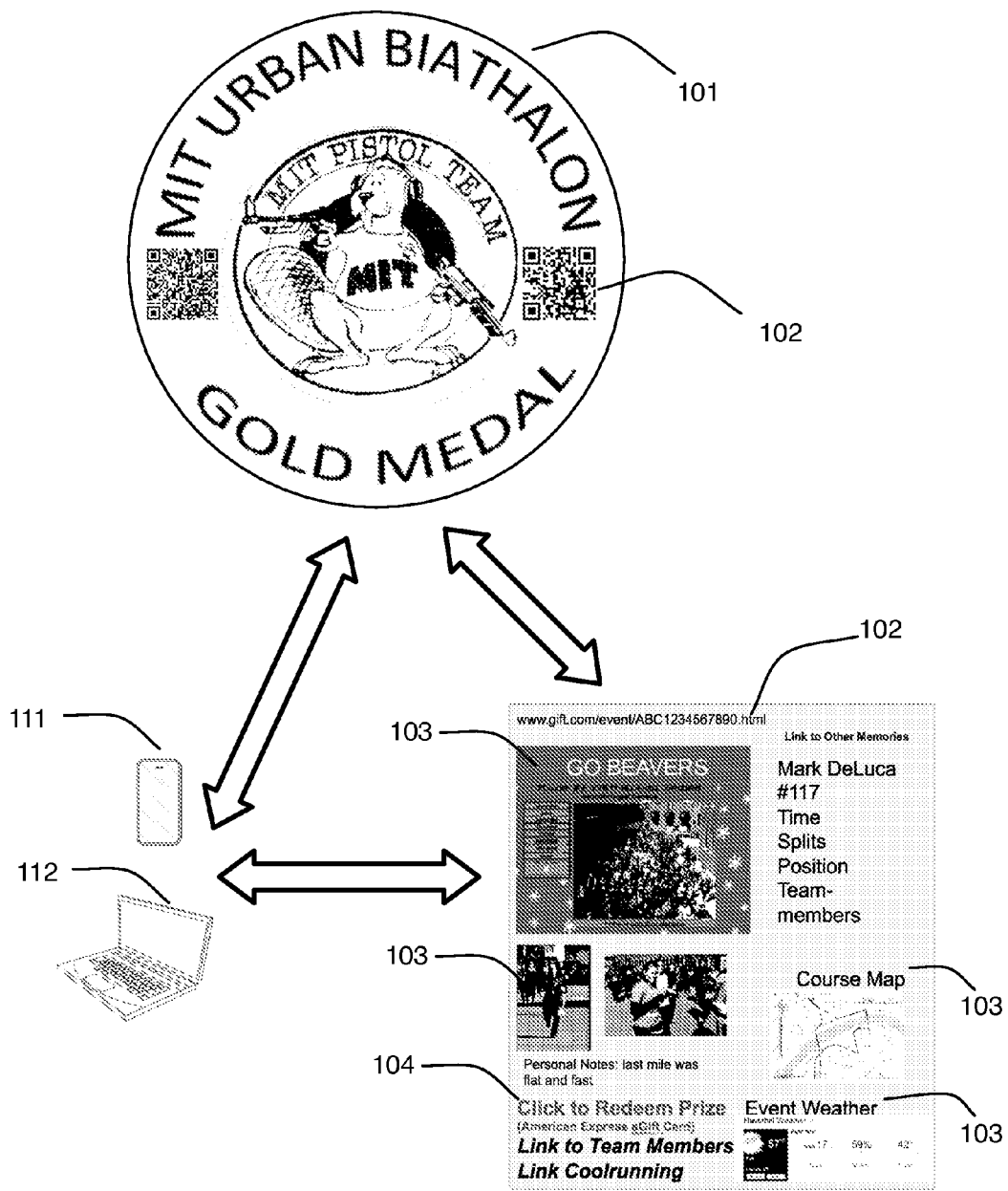
FIG. 2 illustrates exemplary components that make up an embodiment of the system.

FIG. 2 illustrates exemplary components that make up an embodiment of the system. For example, embodiments of the durable memento system include memento 101 that includes a physical object, generally having utility, such as medal, for example received as an award, which provides information as to the successful completion of an event, for example an Urban Biathalon event, in addition to providing code 102 associated with the memento. Embodiments of the invention are not limited to one code and may include multiple codes (see left side of medal for code having redundant data as code 102 or an additional code associated with addition data. As shown, code 102 associated with the memento in this case is a two-dimensional bar code or QR® code. This may be scanned by a camera and application on the mobile device 111 or computer 112 shown in FIG. 1. In addition, embodiments of the invention include data storage that is configured to store and retrieve the code and also configured to store and retrieve data associated with the memento. As shown, the data is displayed in the form of a webpage that includes a description of the event, a picture and/or movie of the event, which may include audio for example, a map of the event, a weather information area as data 103 along with a text version of the code at 102. Other data 104 may include hyperlinks or advertisements that are not directly associated with the event. The data storage is coupled to a computer, for example server 110, or alternatively or in combination in memory in a device remote to memento 101, such as mobile device 111 or computer 112. In addition, embodiments may communicate the code and data over any type of communications network as one skilled in the art will recognize and as shown as logical communications channel arrows in FIGS. 1 and 2. One such communications channel may include wireless or wired communications links, which may for example access or otherwise couple with the Internet to enable remote access from any location.

Embodiments of the system may include any type of memento, for example a keepsake, souvenir, gift, gift card, medal or award, tool or any combination thereof, and the example shown in FIG. 2 is for demonstration purposes only and not intended to be a limiting implementation. Examples further include but are not limited to items such as a special event coin, challenge coin, employee award, marketing giveaway, tournament award, golf divot tool and pet tags. Any memento that includes an association with data, whether stored local to the memento in internal memory or is utilized to access the data remotely, and wherein the data includes information related to the person who gave the memento, place where the memento was given, thing or things associated with the memento, such as the weather, maps, or other metadata associated with the memento including but not limited to hyperlinks, or event at which the memento was given is in keeping with the spirit of the invention.

FIG. 3 illustrates an embodiment of the processing that is utilized by the system to implement the durable memento system. In one or more embodiments, the code is a visual code that is human-readable or machine-readable. Alternatively or in combination, the code may include a non-visual code that is audible or machine-readable. An example of a visual code that is human-readable is an alphanumeric code. One or more embodiments may utilize a code that is a machine-readable bar code that includes a series of parallel lines that travel in one direction, or a machine-readable two-dimensional bar code. Robust and long lasting embodiments may utilize a code that is engraved onto the memento. Other embodiments of the code include a machine-readable radio frequency identification code. Regardless of the type of code utilized or encoding thereon, embodiments of the system obtain the code associated with the memento at 301. The code is then stored in the data store at 302 and is for example associated with a person, place, thing or event, which may previously have been accepted by the system, at the time of the event or at code creation time for example.

One or more embodiments of the data include pictures, movies, sounds, text or performance data associated with the memento. These types of data are not intended to be limiting and may include data in any known format. Regardless of the format or data, it is stored at 303 for future retrieval. Embodiments of the invention may utilize a webpage as shown in FIG. 2 to accept information as is known in the art. Any method of accepting data files is in keeping with the spirit of the invention, including providing a file selection user interface element and an upload button. At a later time, user 120 or 121 or any other authorized user for example may request the data wherein the system receives the request for the data at 304. If the data is stored in one format that becomes obsolete, the system is configured to translate the format into a more current format at 305. Thus, data in out of date file formats, such as older movie file formats, or even on out of date physical formats, such as floppy disks, that are virtually unreadable at this time, may still be accessed using one or more embodiments of the system. For example, at least one embodiment of the system is configured to convert the data from a stored format to a retrieved format via the computer and transmitted over the communications network on retrieval.

In one or more embodiments, the other data may further include advertisements, hyperlinks to gifts or prizes or any combination thereof. This enables the memento to be augmented not only with event or other multimedia data associated with the memento, but also with additional information that may provide a source of revenue for businesses.

Embodiments of the system may obtain the code in a variety of ways. For example, the code may be obtained via the computer after the computer presents an interface having a code entry user interface element, for example on the display of mobile device 111 or computer 112 shown in FIG. 1. The code may also be obtained by the computer from mobile device, which may also be implement as mobile computer 111 after the mobile computer obtains the code visually from the memento through use of a camera coupled with the mobile computer and the computer obtains the code from the mobile computer. Alternatively, or in combination, the code may be obtained by the computer from a mobile computer after the mobile computer obtains the code electronically from the memento through use of a scanner coupled with the mobile computer. All methods of obtaining the code are shown as a thick arrow between the mobile device/computer 111 and computer 112 and the memento 101 in FIG. 2 for example.

When the data is retrieved at any time after being stored, regardless of the format that the data was stored in, the computer, for example mobile device 111, computer 112 and/or computer 110 displays the data that includes pictures, movies, sounds, text, or performance data associated with the memento, or hyperlinks thereto, for example on a webpage or in any other manner.

While the invention herein disclosed has been described by means of specific embodiments and applications thereof, numerous modifications and variations could be made thereto by those skilled in the art without departing from the scope of the invention set forth in the claims.

What is claimed is:

1. A durable memento system comprising:
   a code that is human-readable or machine readable and that is engraved or attached to a memento after the memento is constructed, wherein said code is engraved or attached to said memento by a person who gives the memento or a person that receives the memento,
   wherein said code is associated with data stored remote to said memento and wherein said data is not directly associated with a value of the memento, and
   wherein said code provides a one to one mapping between said data and one memento, and wherein said data is provided by said person who gives the memento or said person who receives the memento or both;
   data storage remote to said memento comprising a single domain name that stores and retrieves memento related information for each of a plurality of disparate mementos from a plurality of disparate manufacturers, wherein said plurality of disparate mementos are associated with a plurality of persons wherein said data storage comprises:
  the code that is coupled with the memento;
  memento metadata that identifies said memento;
  giver data corresponding to said person that gives the memento;
  receiver data corresponding to said person that receives the memento;
  the data associated with said code that is human-readable or machine-readable in said one to one mapping between said code and said one memento;
  wherein said data includes at least pictures, movies or sound or any combination thereof that is
    indirectly associated with the memento via said code and
    directly associated with
      said person who gives the memento, or
      a place where the memento was given, or
      an event where the memento was received, or any combination thereof, and;
  wherein the data storage is coupled to
    a computer and
    a communication network; and,
  said computer configured to
    provide said single domain name in human-readable form to said plurality of persons at least who receive said each of said plurality of disparate mementos from said plurality of disparate manufacturers;
    accept said data comprising at least said pictures, said movies or said sound or any combination thereof, said memento metadata and
      said giver data for said each of said plurality of disparate mementos from said plurality of disparate manufacturers associated with said receiver data,
    retrieve said data comprising at least said pictures, said movies or said sound or any combination thereof, said memento metadata and said giver data for said each of said plurality of disparate mementos from said plurality of disparate manufacturers associated with said receiver data; and,
    provide said data comprising at least said pictures, said movies or said sound or any combination thereof, said memento metadata and said giver data associated with said receiver data to an authorized user comprising said person who receives said plurality of said disparate mementos from said plurality of disparate manufacturers wherein when the data is in an obsolete format, the computer translates the obsolete format into an up-to-date current format in order to enable access to said data.

2. The durable memento system of claim 1, wherein the memento comprises a type of memento selected from a keepsake, souvenir, gift, gift card, medal, trophy or award, tool, tag or any combination thereof, wherein said data is not directly associated with the type of memento.

3. The durable memento system of claim 1, wherein the code comprises an alphanumeric code.

4. The durable memento system of claim 1, wherein the code is a machine-readable bar code comprising a series of parallel lines that travel in one direction.

5. The durable memento system of claim 1, wherein the code is a machine-readable two-dimensional bar code.

6. The durable memento system of claim 1, wherein the data further comprises text or performance data associated with the memento.

7. The durable memento system of claim 1, wherein said data includes other data that comprises advertisements, hyperlinks to gifts or prizes or any combination thereof, wherein said advertisements, hyperlinks to gifts or prizes or any combination thereof are not directly associated with the event.

8. The durable memento system of claim 1, wherein the data is converted from a stored format to a retrieved format via the computer and transmitted over the communications network on retrieval.

9. The durable memento system of claim 1, wherein the code is obtained by the computer after the computer presents an interface having a code entry user interface element.

10. The durable memento system of claim 1, wherein the code is obtained by the computer from a mobile computer after the mobile computer presents an interface having a code entry user interface element.

11. The durable memento system of claim 1, wherein the code is obtained by the computer from a mobile computer after the mobile computer obtains the code visually from the memento through use of a camera coupled with the mobile computer and the computer obtains the code from the mobile computer.

12. The durable memento system of claim 1, wherein the code is obtained by the computer from a mobile computer after the mobile computer obtains the code electronically from the memento through use of a scanner coupled with the mobile computer.

13. The durable memento system of claim 1, wherein the computer displays the data that comprises pictures, movies, sounds, text, or performance data associated with the memento via said single domain name.

14. The durable memento system of claim 1, wherein said data directly associated with a place where the memento was given, or an event where the memento was received, or any combination thereof comprises one or more of a map of said event where the memento was received, weather information of said place where the memento was given, information associated with the completion of said event or any combination thereof.

15. The durable memento system of claim 1, wherein the code is a machine-readable radio frequency identification code.

16. The durable memento system of claim 1, further comprising:
  a second code that is human-readable or machine-readable and that is engraved or attached to the memento after the memento is constructed, wherein said second code is engraved or attached to said memento by the person who gives the memento or the person that receives the memento,
  wherein said second code is associated with second data stored remote to said memento and wherein said second data is not directly associated with a value of the memento, and
  wherein said second code provides a one to one mapping between said second data and the one memento, and wherein said second data is provided by said person who gives the memento or said person who receives the memento or both.

17. The durable memento system of claim 1, wherein the giver data corresponding to said person that gives the memento is the same as the receiver data corresponding to said person that receives the memento.

18. A durable memento system comprising:
a code that is human-readable or machine-readable and that is engraved or attached to a memento after the memento is constructed, wherein said code is engraved or attached to said memento by a person who gives the memento or a person that receives the memento,
  wherein said code is associated with data stored remote to said memento and wherein said data is not directly associated with a value of the memento, and
  wherein said code provides a one to one mapping between said data and one memento, and wherein said data is provided by said person who gives the memento or said person who receives the memento or both, and
  wherein said memento comprises a type of memento selected from a keepsake, souvenir, gift, gift card, medal, trophy or award, tool, tag or any combination thereof, wherein said data is not directly associated with the type of memento;
data storage remote to said memento comprising a single domain name that stores and retrieves memento related information for each of a plurality of disparate mementos from a plurality of disparate manufacturers, wherein said plurality of disparate mementos are associated with a plurality of persons wherein said data storage comprises:
  the code that is coupled with the memento;
  memento metadata that identifies said memento;
  giver data corresponding to said person that gives the memento;
  receiver data corresponding to said person that receives the memento;
  the data associated with said code that is human-readable or machine-readable in said one to one mapping between said code and said one memento, wherein said data includes at least pictures, movies or sound or any combination thereof that is
    indirectly associated with the memento via said code
    and
    directly associated with
      said person who gives the memento, or
      a place where the memento was given, or
      an event where the memento was received, or any combination thereof,
    and;
  wherein the data storage is coupled to
    a computer and
    a communications network; and,
said computer configured to
  provide said single domain name in human-readable form to said plurality of persons at least who receive said each of said plurality of said disparate mementos from said plurality of disparate manufacturers;
  accept said data comprising at least said pictures, said movies or said sound or any combination thereof, said memento metadata and
    said giver data for said each of said plurality of disparate mementos from said plurality of disparate manufacturers associated with said receiver data;
  retrieve said data comprising at least said pictures, said movies or said sound or any combination thereof, said memento metadata and said giver data for said each of said plurality of disparate mementos from said plurality of disparate manufacturers associated with said receiver data; and,
  provide said data comprising at least said pictures, said movies or said sound or any combination thereof, said memento metadata and said giver data associated with said receiver data to an authorized user comprising said person who receives said plurality of said disparate mementos from said plurality of disparate manufacturers wherein the data is converted from a stored format to a retrieved format via the computer and transmitted over the communications network on retrieval and wherein when the data is in an obsolete format, the computer translates the obsolete format into an up-to-date current format in order to enable access to said data.

19. A durable memento method comprising:
engraving or attaching a code that is human-readable or machine-readable to a memento after the memento is constructed, wherein said code is engraved or attached to said memento by a person who gives the memento or a person that receives the memento,
  wherein said code is associated with data stored remote to said memento and wherein said data is not directly associated with a value of the memento, and
  wherein said code provides a one to one mapping between said data and one memento, and wherein said data is provided by said person who gives the memento or said person who receives the memento or both;
storing and retrieving memento related information for each of a plurality of disparate mementos from a plurality of disparate manufacturers to and from data storage remote to said memento comprising a single domain name, wherein said plurality of disparate mementos are associated with a plurality of persons wherein said data storage comprises:
  the code that is coupled with the memento;
  memento metadata that identifies said memento;
  giver data corresponding to said person that gives the memento;
  receiver data corresponding to said person that receives the memento;
  the data associated with said code that is human-readable or machine-readable in said one to one mapping between said code and said one memento, wherein said data includes at least pictures, movies or sound or any combination thereof that is
    indirectly associated with the memento via said code
    and
    directly associated with
      said person who gives the memento, or
      a place where the memento was given, or
      an event where the memento was received, or any combination thereof,
    and;
  wherein the data storage is coupled to
    a computer and
    a communications network; and,
providing said single domain name to said computer in human-readable form to said plurality of persons at least who receive said each of said plurality of said disparate mementos from said plurality of disparate manufacturers;
accepting by said computer, said data comprising at least said pictures, said movies or said sound or any combination thereof,
  said memento metadata and said giver data for said each of said plurality of disparate mementos from said plurality of disparate manufacturers associated with said receiver data;

retrieving said data by said computer, comprising at least said pictures, said movies or said sound or any combination thereof, said memento metadata and said giver data for said each of said plurality of disparate mementos from said plurality of disparate manufacturers associated with said receiver data; and, providing said data comprising at least said pictures, said movies or said sound or any combination thereof, said memento metadata and said giver data associated with said receiver data to an authorized user comprising said person who receives said plurality of said disparate mementos from said plurality of disparate manufacturers wherein when the data is in an obsolete format, translating the obsolete format into an up-to-date current format in order to enable access to said data.

20. The durable memento method of claim 19, further comprising converting the data from a stored format to a retrieved format via the computer and transmitting the data over the communications network on retrieval.

21. The durable memento method of claim 19, further comprising obtaining the code by the computer after presenting an interface having a code entry user interface element.

22. The durable memento method of claim 19, further comprising obtaining the code by the computer from a mobile computer after presenting an interface by the mobile computer having a code entry user interface element.

23. The durable memento method of claim 19, further comprising obtaining the code by the computer from a mobile computer after obtaining the code visually by the mobile computer from the memento through use of a camera coupled with the mobile computer.

24. The durable memento method of claim 19, further comprising obtaining the code by the computer from a mobile computer after obtaining the code by the mobile computer electronically from the memento through use of a scanner coupled with the mobile computer.

25. The durable memento method of claim 19, further comprising displaying by the computer, the data that comprises pictures, movies, sounds, text, or performance data associated with the memento via said single domain name.

26. The durable memento method of claim 19, wherein the code is a machine-readable radio frequency identification code.

27. The durable memento method of claim 19, further comprising:

engraving or attaching a second code that is human-readable or machine-readable to the memento after the memento is constructed, wherein said second code is engraved or attached to said memento by the person who gives the memento or the person that receives the memento, wherein said second code is associated with second data stored remote to said memento and wherein said second data is not directly associated with a value of the memento, and wherein said second code provides a one to one mapping between said second data and the one memento, and wherein said second data is provided by said person who gives the memento or said person who receives the memento or both.

28. The durable memento method of claim 19, wherein said data directly associated with a place where the memento was given, or an event where the memento was received, or any combination thereof comprises one or more of a map of said event where the memento was received, weather information of said place where the memento was given, information associated with the completion of said event or any combination thereof.

* * * * *